(12) United States Patent
Hirato et al.

(10) Patent No.: US 8,188,160 B2
(45) Date of Patent: May 29, 2012

(54) INK SET FOR INKJET RECORDING, IMAGE RECORDING METHOD AND IMAGE RECORDING APPARATUS

(75) Inventors: Katsuyuki Hirato, Kanagawa-ken (JP); Koji Furukawa, Kanagawa-ken (JP); Masao Ikoshi, Kanagawa-ken (JP); Yoshimitsu Arai, Kanagawa-ken (JP)

(73) Assignee: Fujifilm Corporation, Tokyo (JP)

( * ) Notice: Subject to any disclaimer, the term of this patent is extended or adjusted under 35 U.S.C. 154(b) by 461 days.

(21) Appl. No.: 12/410,088

(22) Filed: Mar. 24, 2009

(65) Prior Publication Data
US 2009/0246382 A1 Oct. 1, 2009

(30) Foreign Application Priority Data
Mar. 25, 2008 (JP) .................. 2008-077727

(51) Int. Cl.
*C09D 11/10* (2006.01)
(52) U.S. Cl. ....................................... 523/160
(58) Field of Classification Search .................. 523/160
See application file for complete search history.

(56) References Cited

U.S. PATENT DOCUMENTS

| 2007/0054981 | A1 | 3/2007 | Yanagi et al. |
| 2007/0197684 | A1 | 8/2007 | Yamashita et al. |
| 2008/0055385 | A1 | 3/2008 | Houjou |
| 2008/0071007 | A1 | 3/2008 | Spinelli |

FOREIGN PATENT DOCUMENTS

| EP | 0778321 A2 | 6/1997 |
| EP | 1088865 A1 | 4/2001 |
| EP | 1132438 A2 | 9/2001 |
| JP | 2007-161753 A | 6/2007 |
| JP | 2007-245616 A | 9/2007 |

*Primary Examiner* — David W Wu
*Assistant Examiner* — Vu A Nguyen
(74) *Attorney, Agent, or Firm* — Birch, Stewart, Kolasch & Birch, LLP (57) ABSTRACT

The ink set for inkjet recording includes: a water-based ink containing pigment particles and 10 to 25 wt % of water-soluble high-boiling-point organic solvent having an SP value of not higher than 30; and a treatment liquid containing a fluidity reducing agent which reduces fluidity of the pigment particles by making contact with the water-based ink, and 10 to 25 wt % of water-soluble high-boiling-point organic solvent having an SP value of not higher than 30.

4 Claims, 3 Drawing Sheets

INK SET FOR INKJET RECORDING, IMAGE RECORDING METHOD AND IMAGE RECORDING APPARATUS

BACKGROUND OF THE INVENTION

1. Field of the Invention

The present invention relates to an ink set for inkjet recording, an image recording method and an image recording apparatus, and more particularly, to an ink set for inkjet recording including a water-based ink and a treatment liquid, an image recording method and an image recording apparatus.

2. Description of the Related Art

An offset printing method is known as a method whereby images of high quality can be printed onto paper of any type. There have been increasing requirements for on-demand printing which has the advantages of the offset printing method. Several methods, such as an inkjet method, have been proposed as on-demand printing methods.

In general, an inkjet recording system uses an inkjet head, in which a plurality of nozzles are formed, and forms an image on a recording medium by ejecting and depositing ink droplets from the nozzles onto a recording medium; such apparatuses are used widely due to their excellent low-noise operation, low running costs, and their ability to record images of high quality onto recording media of many different types.

Japanese Patent Application Publication Nos. 2007-245616 and 2007-161753 disclose image recording methods which use an ink set for inkjet recording including a treatment liquid and an ink, the main component thereof between a high-boiling-point low-polarity solvent other than water, in order to stabilize ejection, achieve high image quality and suppress curling of the paper.

However, since these inks contain a large amount of high-boiling-point low-polarity solvent, in other words, solvent of low volatility, then when the treatment liquid and the pigment react together to generate an aggregate, the aggregate moves in the solvent remaining on the paper surface, giving rise to dot movement (floating of the coloring material) and thus leading to decline in image quality. Furthermore, if high-boiling-point solvent is left in the printed object, then stickiness occurs in the printed object and problems can arise when the solvent evaporates.

SUMMARY OF THE INVENTION

The present invention has been contrived in view of these circumstances, an object thereof being to provide an ink set for inkjet recording, an image recording method and an image recording apparatus whereby images can be recorded onto normal paper with high quality, while obtaining good properties in terms of dot movement and the surface characteristics of the printed object, and reducing the organic solvent evaporation.

In order to attain the aforementioned object, the present invention is directed to an ink set for inkjet recording, comprising: a water-based ink containing pigment particles and 10 to 25 wt % of water-soluble high-boiling-point organic solvent having an SP value of not higher than 30; and a treatment liquid containing a fluidity reducing agent which reduces fluidity of the pigment particles by making contact with the water-based ink, and 10 to 25 wt % of water-soluble high-boiling-point organic solvent having an SP value of not higher than 30.

As a result of thorough investigation, the present inventors have discovered that by including 10 to 25 wt % of the water-soluble high-boiling-point organic solvent having the SP value of 30 or lower in both the water-based ink and the treatment liquid, it is possible to reduce the occurrence of floating of coloring material, reduce stickiness of the surface of the recording medium, and suppress the incidence of curl.

In particular, by including the water-soluble high-boiling-point organic solvent having the SP value of 30 or lower in both the water-based ink and the treatment liquid, the amount of liquid that is absorbed into the recording medium and produces curl are reduced, and therefore it is possible further to suppress curl.

Here, the SP value is the "Solubility Parameter" of the solvent. In the present invention, the SP value of 30 or lower is stated, and no lower limit of the SP value is stated. In general, the lower the SP value, the lower the solubility in water. In the present invention, the lower limit of the SP value is substantially determined by specifying the high-boiling-point organic solvent as water-soluble. Consequently, the water-soluble high-boiling-point organic solvent having the SP value of 30 or lower is stated, and a lower limit is not stated.

Here, high-boiling-point means a boiling point of 240° C. or higher at 1 atm. More desirably, the boiling point is 380° C. or higher.

Furthermore, here, "fluidity reducing" means that the volume-average particle size in a water dilution as measured with a particle size analyzer LA-920 made by Horiba is increased by 100% or more.

Preferably, the fluidity reducing agent includes at least one of a solvent, an acid generator and an acid treatment liquid which reduce phase-solubility of the pigment particles.

According to this aspect of the present invention, it is possible to generate an aggregate of the pigment particles by using the above-described composition as the fluidity reducing agent.

Preferably, at least one of the water-based ink and the treatment liquid further contains polymer particles.

According to this aspect of the present invention, since the polymer particles are included in at least one of the water-based ink and the treatment liquid, it is possible to enhance the ink viscosity raising action and the aggregating action due to reaction with the treatment liquid, and therefore image quality can be improved. Furthermore, depending on the type of polymer particles, the polymer particles form a film on the recording medium and hence the weatherproofing and waterproofing properties of the image can be improved.

Preferably, at least one of the water-based ink and the treatment liquid contains at least two types of water-soluble high-boiling-point organic solvents having an SP value of not higher than 30.

According to this aspect of the present invention, since two or more types of the water-soluble high-boiling-point organic solvents having the SP value of 30 or lower are included, then it is possible to adjust the viscosity freely during manufacture of the ink.

In order to attain the aforementioned object, the present invention is also directed to an image recording method using the above-described ink set for inkjet recording, comprising the steps of: depositing one of the water-based ink and the treatment liquid firstly onto a recording medium; depositing subsequently the other of the water-based ink and the treatment liquid onto the recording medium so as to form an image by making the water-based ink and the treatment liquid come into contact with each other; and one of fixing the image and covering the image with an ultraviolet-curable ink.

According to this aspect of the present invention, since an image is formed by bringing the water-based ink and the treatment liquid into mutual contact on the recording medium, using the ink set for inkjet recording described above, then it is possible to achieve the image recording method that reduces the occurrence of floating of the coloring material, reduces the stickiness of the surface of the recording medium, and suppresses the occurrence of curl.

Preferably, the image recording method further comprises the step of, after at least one of the depositing steps, drying or semi-drying the deposited one of the water-based ink and the treatment liquid.

According to this aspect of the present invention, since drying or semi-drying is carried out after depositing the water-based ink and/or the treatment liquid onto the recording medium, then the water-based ink and/or the treatment liquid assumes a solid or semi-solid state. By this means, it is possible readily to separate the aggregate of the pigment particles from the solvent. Furthermore, since the drying of the recording medium can be promoted, then the image can be fixed quickly and therefore high-speed printing can be achieved.

Here, "drying or semi-drying" means rendering to a solid state or semi-solid state in which a water content rate is within 0% to 70%, where the water content rate is defined as: "Water content rate"="Weight of water contained in treatment liquid after drying, per unit surface area $(g/m^2)$"/"Weight of treatment liquid after drying, per unit surface area $(g/m^2)$".

The drying can be carried out by at least one of air blowing, heating, and irradiation of energizing radiation.

In order to attain the aforementioned object, the present invention is also directed to an image recording apparatus which forms an image using the above-described ink set for inkjet recording. It is preferable that the image recording apparatus comprises: one of an inkjet head and a roller coater which deposits the treatment liquid onto a recording medium; and an inkjet head which deposits the water-based ink onto the recording medium.

According to this aspect of the present invention, since an image is formed by bringing the water-based ink and the treatment liquid into mutual contact on the recording medium, using the ink set for inkjet recording described above, then it is possible to achieve an image recording that reduces the occurrence of floating of the coloring material, reduces the stickiness of the surface of the recording medium, and suppresses the occurrence of curl.

Preferably, the image recording apparatus further comprises a drying device which dries or semi-dries at least one of the water-based ink and the treatment liquid that has been deposited on the recording medium.

Preferably, the image recording apparatus further comprises a heating device arranged between the one of the inkjet head and the roller coater which deposits the treatment liquid onto the recording medium, and the inkjet head which deposits the water-based ink onto the recording medium.

According to this aspect of the present invention, by heating a drum by means of the heating device provided between the deposition device of the treatment liquid and the inkjet head, evaporation of the water content in the treatment liquid is promoted and curl and floating movement of coloring material can be prevented. Furthermore, the rate of reduction in fluidity can also be raised by heating. Heating of the drum is particularly effective in cases where the treatment liquid includes a thermal acid generator.

Preferably, the image recording apparatus further comprises a fixing device which fixes the image formed on the recording medium.

According to this aspect of the present invention, since the image is fixed on the recording medium by means of the fixing device after image recording, then it is possible to obtain stable fixing properties. As the fixing device, it is desirable to fix the image by applying heat and pressure to the recording medium on which the image has been formed by pressing the recording medium between a pressing roller and a heating roller.

Preferably, the image recording apparatus further comprises: a UV ink deposition device which deposits a transparent ultraviolet-curable ink onto the image formed on the recording medium; and a UV irradiation device which irradiates ultraviolet light onto the transparent ultraviolet-curable ink having been deposited on the image on the recording medium.

According to this aspect of the present invention, it is possible to form a thin film layer (transparent ultraviolet-curable coating layer) made of the transparent ultraviolet-curable ink on the recording medium. Thus, it is possible to achieve a glossy image showing no difference in appearance from offset printing, while ensuring good image strength.

According to the present invention, it is possible to provide the ink set for inkjet recording, the image recording method and the image recording apparatus whereby images can be recorded with good quality on normal paper, while achieving little dot movement, satisfactory surface properties of the printed object and little occurrence of organic solvent vapor.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

Below, preferred embodiments of the present invention are described in accordance with the accompanying drawings. The present invention is described on the basis of preferred embodiments below, but it is also possible to implement various modifications and use embodiments other than the present embodiments, without diverging from the scope of the present invention. Consequently, all variations within the scope of the present invention are included in the scope of the claims.

In the present specification, value ranges expressed as "XX to YY" mean a range of "not less than XX and not more than YY".

Preferred embodiments of an ink set for inkjet recording, and an image recording method and an image recording apparatus are described in detail below.

Ink Set for Inkjet Recording

The ink set for inkjet recording according to an embodiment of the present invention principally includes: a water-based ink containing 10 to 25 wt % of a water-soluble high-boiling point organic solvent having an SP value of 30 or lower; and a treatment liquid containing a fluidity reducing agent that reduces the fluidity of the ink by making contact with the water-based ink, and 10 to 25 wt % of a water-soluble high-boiling-point organic solvent having an SP value of 30 or lower. Here, the SP value is the "Solubility Parameter" of the solvent, and the SP value ((Hildebrand) Solubility Parameter value) $\delta$ is defined as: $\delta = \sqrt{(\Delta H - RT)/V}$, where $\Delta H$ stands for the "molar heat of vaporization", R stands for the "gas constant", T stands for the "absolute temperature", and V stands for the "molar volume", as known in the art. In the present invention, the SP value of 30 or lower is stated, and no lower limit of the SP value is stated.

<Water-Soluble High-Boiling-Point Organic Solvent Having SP Value of 30 or Lower>

The ink set for inkjet recording according to the present embodiment contains 10 to 25 wt % of the water-soluble high-boiling-point organic solvent having the SP value of 30 or lower. If this value is less than 10 wt %, then curling becomes great. Furthermore, if it is greater than 25 wt %, then problems of stickiness on the recording medium surface and floating movement of coloring material occur. Desirably, the range is 12 to 20 wt %.

If the SP value is greater than 30, then the curl suppressing effect is inadequate. The lower limit value of the SP value should be in a range that displays water soluble properties. Desirably, the range of the SP value is 20 to 28.

Next, examples of water-soluble high-boiling-point organic solvents having the SP values of 30 or lower are listed as follows, together with their SP values.

GP-250 (SP value: 25) (made by Sanyo Chemical Industries, product name: GP-250);
50-HB-200 (21): (made by Sanyo Chemical Industries, product name: 50-HB-400);
diethylene glycol monoethyl ether (22.4);
diethylene glycol monobutyl ether (21.5);
1,2 hexane diol (27.4);
dipropylene glycol (27.2);
tripropylene glycol (24.74);
triethylene glycol monobutyl ether (21.1); and
$nC_4H_9O(AO)_{10}H$ (AO=EO or PO, ratio 1:1) (18.8).

The present invention is not limited to the materials described above.

Water-Based Ink

The ink used in the present embodiment is water-based pigment ink that contains the following materials insoluble to the solvent (water): pigment particles as the coloring material, and polymer particles.

It is desirable that the concentration of the solvent-insoluble materials in the ink is not less than 1 wt % and not more than 20 wt %, taking account of the fact that the viscosity of the ink suitable for ejection is 20 mPa·s or lower. It is more desirable that the concentration of the pigment in the ink is not less than 4 wt %, in order to obtain good optical density in the image. It is desirable that the surface tension of the ink is not less than 20 mN/m and not more than 40 mN/m, taking account of ejection stability.

The coloring material in the ink may be pigment or a combination of pigment and dye. From the viewpoint of the aggregating characteristics when the ink comes into contact with the treatment liquid, a dispersed pigment in the ink is desirable for more effective aggregation. Desirable pigments include: a pigment dispersed by a dispersant, a self-dispersing pigment, a pigment in which the pigment particle is coated with a resin (hereinafter referred to as "microcapsule pigment"), and a polymer grafted pigment. Moreover, from the viewpoint of the aggregating characteristics of the coloring material, it is more desirable that the coloring material is modified with a carboxyl group having a low degree of disassociation.

There are no particular restrictions on the resin used for a microcapsule pigment, but desirably, it should be a compound of high molecular weight which has a self-dispersing capability or solubility in water, and contains an anionic group (acidic). Generally, it is desirable that the resin should have a number average molecular weight in the approximate range of 1,000 to 100,000, and especially desirably, in the approximate range of 3,000 to 50,000. Moreover, desirably, this resin can dissolved in an organic solvent to form a solution. By limiting the number average molecular weight of the resin to this range, it is possible to make the resin display satisfactory functions as a covering film for the pigment particle, or as a coating film in the ink composition.

The resin may itself have a self-dispersing capability or solubility, or these functions may be added or introduced. For example, it is possible to use a resin having an introduced carboxyl group, sulfonic acid group, or phosphonic acid group or another anionic group, by neutralizing with an organic amine or alkali metal. Moreover, it is also possible to use a resin into which one or two or more anionic groups of the same type or different types have been introduced. In the embodiment of the present invention, it is desirable to use a resin which has been neutralized by means of a salt and which contains an introduced carboxyl group.

There are no particular restrictions on the pigment used in the present embodiment, and specific examples of orange and yellow pigments are: C. I. Pigment Orange 31, C. I. Pigment Orange 43, C. I. Pigment Yellow 12, C. I. Pigment Yellow 13, C. I. Pigment Yellow 14, C. I. Pigment Yellow 15, C. I. Pigment Yellow 17, C. I. Pigment Yellow 74, C. I. Pigment Yellow 93, C. I. Pigment Yellow 94, C. I. Pigment Yellow 128, C. I. Pigment Yellow 138, C. I. Pigment Yellow 151, C. I. Pigment Yellow 155, C. I. Pigment Yellow 180, and C.I. Pigment Yellow 185.

Specific examples of red and magenta pigments are: C. I. Pigment Red 2, C. I. Pigment Red 3, C. I. Pigment Red 5, C. I. Pigment Red 6, C. I. Pigment Red 7, C. I. Pigment Red 15, C. I. Pigment Red 16, C. I. Pigment Red 48:1, C. I. Pigment Red 53:1, C. I. Pigment Red 57:1, C. I. Pigment Red 122, C. I. Pigment Red 123, C. I. Pigment Red 139, C. I. Pigment Red 144, C. I. Pigment Red 149, C. I. Pigment Red 166, C. I. Pigment Red 177, C. I. Pigment Red 178, and C.I. Pigment Red 222.

Specific examples of green and cyan pigments are: C. I. Pigment Blue 15, C. I. Pigment Blue 15:2, C. I. Pigment Blue 15:3, C. I. Pigment Blue 16, C. I. Pigment Blue 60, and C.I. Pigment Green 7.

Specific examples of a black pigment are: C.I. Pigment Black 1, C.I. Pigment Black 6, and C.I. Pigment Black 7.

It is desirable in the present embodiment that the ink contains polymer particles that do not contain any colorant, as a component for reacting with the treatment liquid. The polymer particles can improve the image quality by strengthening the ink viscosity raising action and the aggregating action through reaction with the treatment liquid. In particular, a highly stable ink can be obtained by adding anionic polymer particles to the ink.

By using the ink containing the polymer particles that produce the viscosity raising action and the aggregating action through reaction with the treatment liquid, it is possible to increase the quality of the image, and at the same time, depending on the type of polymer particles, the polymer particles may form a film on the recording medium, and therefore beneficial effects can be obtained in improving the wear resistance and the waterproofing characteristics of the image.

The method of dispersing the polymer particles in the ink is not limited to adding an emulsion of the polymer particles to the ink, and the resin may also be dissolved, or included in the form of a colloidal dispersion, in the ink.

The polymer particles may be dispersed by using an emulsifier, or the polymer particles may be dispersed without using any emulsifier. For the emulsifier, a surfactant of low molecular weight is generally used, and it is also possible to use a surfactant of high molecular weight. It is also desirable to use a capsule type of polymer particles having an outer shell composed of acrylic acid, methacrylic acid, or the like (core-shell type of polymer particles in which the composition is different between the core portion and the outer shell portion).

The polymer particles dispersed without any surfactant of low molecular weight are known as the soap-free latex, which includes polymer particles with no emulsifier or a surfactant of high molecular weight. For example, the soap-free latex includes polymer particles that use, as an emulsifier, the above-described polymer having a water-soluble group, such as a sulfonic acid group or carboxylic acid group (a polymer with a grafted water-soluble group, or a block polymer obtained from a monomer having a water-soluble group and a monomer having an insoluble part).

It is especially desirable in the present embodiment to use the soap-free latex compared to other type of resin particles obtained by polymerization using an emulsifier, since there is no possibility that the emulsifier inhibits the aggregating reaction and film formation of the polymer particles, or that the free emulsifier moves to the surface after film formation of the polymer particles and thereby degrades the adhesive properties between the recording medium and the ink aggregate in which the coloring material and the polymer particles are combined.

Examples of the resin component added as the resin particles to the ink include: an acrylic resin, a vinyl acetate resin, a styrene-butadiene resin, a vinyl chloride resin, an acryl-styrene resin, a butadiene resin, and a styrene resin.

In order to make the polymer particles have high speed aggregation characteristics, it is desirable that the polymer particles contain a carboxylic acid group having a low degree of disassociation. Since the carboxylic acid group is readily affected by change of pH, then the polymer particles containing the carboxylic acid group easily change the state of the dispersion and have high aggregation characteristics.

The change in the dispersion state of the polymer particles caused by change in the pH can be adjusted by means of the component ratio of the polymer particle having a carboxylic acid group, such as ester acrylate, or the like, and it can also be adjusted by means of an anionic surfactant which is used as a dispersant.

Desirably, the resin constituting the polymer particles is a polymer that has both of a hydrophilic part and a hydrophobic part. By incorporating a hydrophobic part, the hydrophobic part is oriented toward to the inner side of the polymer particle, and the hydrophilic part is oriented efficiently toward the outer side, thereby having the effect of further increasing the change in the dispersion state caused by change in the pH of the liquid. Therefore, aggregation can be performed more efficiently.

Desirably, a carboxylic acid polymer is used as an acidic polymer.

Since the pKa of carboxylic acid is approximately 3 to 4, then if the pH is 5, the acid polymer assumes an almost separated state and therefore has stable dispersion characteristics due to electric repulsion, and aggregation does not occur. If the pH is lower than this, then the polymer assumes a non-separated state, the electric repulsion is lost and aggregation arises.

Examples of commercially available resin emulsion include: Joncryl 537 and 7640 (styrene-acrylic resin emulsion, manufactured by Johnson Polymer), Microgel E-1002 and E-5002 (styrene-acrylic resin emulsion, manufactured by Nippon Paint), Voncoat 4001 (acrylic resin emulsion, manufactured by Dainippon Ink and Chemicals), Voncoat 5454 (styrene-acrylic resin emulsion, manufactured by Dainippon Ink and Chemicals), SAE-1014 (styrene-acrylic resin emulsion, manufactured by Zeon Japan), Jurymer ET-410 (acrylic resin emulsion, manufactured by Nihon Junyaku), Aron HD-5 and A-104 (acrylic resin emulsion, manufactured by Toa Gosei), Saibinol SK-200 (acrylic resin emulsion, manufactured by Saiden Chemical Industry), and Zaikthene L (acrylic resin emulsion, manufactured by Sumitomo Seika Chemicals). However, the resin emulsion is not limited to these examples.

The weight ratio of the polymer particles to the pigment is desirably 2:1 through 1:10, and more desirably 1:1 through 1:3. If the weight ratio of the polymer particles to the pigment is less than 2:1, then there is no substantial improvement in the aggregating force of the aggregate formed by the cohesion of the polymer particles. On the other hand, if the weight ratio of the polymer particles to the pigment is greater than 1:10, the viscosity of the ink becomes too high and the ejection characteristics, and the like, deteriorate.

From the viewpoint of the adhesive force after the cohesion, it is desirable that the molecular weight of the polymer particles added to the ink is no less than 5,000. If it is less than 5,000, then beneficial effects are insufficient in terms of improving the internal aggregating force of the ink aggregate, achieving good fixing characteristics after transfer to the recording medium, and improving the image quality.

Desirably, the volume-average particle size of the polymer particles is in the range of 10 nm to 1 μm, more desirably, the range of 10 nm to 500 nm, even desirably 20 nm to 200 nm and particularly desirably, the range of 50 nm to 200 nm. If the particle size is equal to or less than 10 nm, then significant effects in improving the image quality or enhancing transfer characteristics cannot be expected, even if aggregation occurs. If the particle size is equal to or greater than 1 μm, then there is a possibility that the ejection characteristics from the ink head or the storage stability will deteriorate. Furthermore, there are no particular restrictions on the volume-average particle size distribution of the polymer particles and they may have a broad volume-average particle size distribution or they may have a monodisperse volume-average particle size distribution.

Moreover, two or more types of polymer particles may be used in combination in the ink.

Examples of the pH adjuster added to the ink in the present embodiment include an organic base and an inorganic alkali base, as a neutralizing agent. In order to improve storage stability of the ink for inkjet recording, the pH adjuster is desirably added in such a manner that the ink for inkjet recording has the pH of 6 through 10.

It is possible to use an organic salt or an inorganic alkaline base as a neutralizing pH adjuster which is added to the ink. Desirably, a pH adjuster is added so as to adjust the ink to a pH of 6 to 10, in order to improve the storage stability of the inkjet ink.

The ink in the present embodiment contains the water-soluble high-boiling-point organic solvent having an SP value of 30 or lower at a rate of 10 wt % to 90 wt % with the object of preventing blockages of the nozzles of the inkjet head due to drying. Moreover, by including the aforementioned water-soluble high-boiling-point organic solvent at a rate in the range of 10% to 30%, particularly desirable results are obtained in terms of landing interference, image deformation, and small dot white spot reproducibility, and furthermore, the lightfastness of the formed image is good.

A water-soluble high-boiling-point organic solvent of this kind includes a moistening agent or a penetrating agent. Similarly to the case of the treatment liquid, water-soluble high-boiling-point organic solvents having an SP value of 30 or lower include, for instance:

diethylene glycol monoethyl ether (22.4)
diethylene glycol monobutyl ether (21.5)
triethylene glycol monobutyl ether (21.1)
dipropylene glycol monomethyl ether (21.3)
dipropylene glycol (27.2)

$l + m + n = 3$
(26.4)

$l + m + n = 4$
(24.9)

$l + m + n = 5$
(23.9)

$l + m + n = 6$
(23.2)

$l + m + n = 7$
(22.6)

PO = propylene oxy (oxypropylene)

$nC_4H_9O(AO)_4$—H (AO=EO or PO, ratio 1:1) (20.1)
EO=ethylene oxy (oxyethylene)
$nC_4H_9O(AO)_{10}$—H (as above) (18.8)
$HO(A'O)_{40}$—H (A'O=EO or PO, ratio EO:PO=1:3) (18.7)
$HO(A''O)_{55}$—H (A''O=EO or PO, ratio EO:PO=5:6) (18.8)
$HO(PO)_3H$ (24.7)
$HO(PO)_7H$ (21.2)
1,2 hexanediol (27.4)
The numbers in parentheses indicate SP values.

Furthermore, of the solvents having a low SP value, it is desirable to include the following structure.

$l + m + n = 3\text{-}15$

The above are possible examples.

The ink according to the present embodiment may contain a surfactant.

Examples of the surfactant in the ink include: in a hydrocarbon system, an anionic surfactant, such as a salt of a fatty acid, an alkyl sulfate ester salt, an alkyl benzene sulfonate salt, an alkyl naphthalene sulfonate salt, a dialkyl sulfosuccinate salt, an alkyl phosphate ester salt, a naphthalene sulfonate/formalin condensate, and a polyoxyethylene alkyl sulfonate ester salt; and a non-ionic surfactant, such as a polyoxyethylene alkyl ether, a polyoxyethylene alkyl aryl ether, a polyoxyethylene fatty acid ester, a sorbitan fatty acid ester, a polyoxyethylene sorbitan fatty acid ester, a polyoxyethylene alkyl amine, a glycerin fatty acid ester, and an oxyethylene oxypropylene block copolymer. Desirable examples of the surfactant further include: Surfynols (manufactured by Air Products & Chemicals), which is an acetylene-based polyoxyethylene oxide surfactant, and an amine oxide type of amphoteric surfactant, such as N,N-dimethyl-N-alkyl amine oxide.

Moreover, it is also possible to use the surfactants cited in Japanese Patent Application Publication No. 59-157636, pages 37 to 38, and Research Disclosure No. 308119 (1989). Furthermore, it is also possible to use a fluoride type (alkyl fluoride type), or silicone type of surfactant such as those described in Japanese Patent Application Publication Nos. 2003-322926, 2004-325707 and 2004-309806. It is also possible to use a surface tension adjuster of this kind as an anti-foaming agent; and a fluoride or silicone compound, or a chelating agent, such as ethylenediamine tetraacetic acid (EDTA), can also be used.

The surfactant contained in the ink has beneficial effects in raising the wettability on the solid or semi-solid aggregating treatment agent layer by reducing the surface tension, and therefore the aggregating action effectively progresses due to the increase in the contact surface area between the solid or semi-solid aggregating treatment agent layer and the ink.

It is desirable in the present embodiment that the ink has the surface tension of 10 mN/m to 45 mN/m from the viewpoint of simultaneously achieving good wetting properties on an intermediate transfer medium when recording by an intermediate transfer method, as well as finer size of the liquid droplets and good ejection characteristics.

It is desirable in the present embodiment that the ink has the viscosity of 1.0 mPa·s through 20.0 mPa·s.

Apart from the foregoing, according to requirements, it is also possible that the ink contains a pH buffering agent, an anti-oxidation agent, an antibacterial agent, a viscosity adjusting agent, a conductive agent, an ultraviolet absorbing agent, or the like.

Treatment Liquid

The treatment liquid according to the present embodiment includes at least water and a fluidity reducing agent, and according to requirements, a water-soluble high-boiling-point organic solvent having an SP value of 30 or lower.

A possible example of a composition that reduces the fluidity of the water-based ink is a liquid composition that generates an aggregate by aggregating the pigment particles contained in the water-based ink through changing the pH of the ink. In this case, desirably, the pH of the liquid composition is 1 to 6, and more desirably, the pH is 2 to 5, and particularly desirably, the pH is 3 to 5. Desirably, the liquid composition includes: a liquid component that generates an aggregate by means of an acid and cationic compound, and suitable inorganic acids for use in the liquid composition are hydrochloric acid, hydrobromic acid, sulfuric acid, nitric acid, phosphoric acid, and boric acid, of which phosphoric acid and boric acid are particularly suitable.

Moreover, suitable organic acids are fatty carboxylic acids, such as formic acid, acetic acid, propionic acid, butyric acid, isobutyric acid, valeric acid, isovaleric acid, caproic acid, enanthic acid, caprylic acid, pelargonic acid, capric acid, lauric acid, myristic acid, pentadecyl acid, palmitic acid, margaric acid, stearic acid, oleic acid, linoleic acid, linolenic acid, tuberculostearic acid, arachidic acid, arachidonic acid, eicosapentaenoic acid, behenic acid, docosahexaenoic acid, lignoceric acid, cerotinic acid, montanic acid, and melissic acid, and of these, formic acid and acetic acid are particularly suitable.

Further, it is also suitable to use an aromatic carboxylic acid, such as salicylic acid, gallic acid, benzoic acid, phthalic acid, cinnamic acid, and mellitic acid, of which salicylic acid and phthalic acid are particularly suitable.

Furthermore, in addition to the foregoing, it is particularly suitable to use: oxalic acid, lactic acid, tartaric acid, maleic acid, fumaric acid, malonic acid, succinic acid, malic acid, citric acid, aconitic acid, glutaric acid, adipic acid, amino acid, L-ascorbic acid, methane sulfonic acid, benzene sulfonic acid, p-toluene sulfonic acid, CSA, and a phosphoric acid.

If the compound used in the present embodiment has an acidic group such as —COOH, then it is possible to form a salt with an inorganic base (for example, an alkali metal salt or alkali rare earth metal salt of sodium, potassium, calcium, magnesium, or the like, a polyvalent metal, such as zinc, aluminum, barium, tin, nickel, cobalt, strontium, or the like, or ammonia), or with an organic base (for example, trimethyl amine, triethyl amine, pyridine, picoline, ethanol amine, diethanol amine, triethanol amine, dicyclohexyl amine, N,N'-dibenzyl ethylene diamine, or the like).

These compositions can be added to the treatment liquid in the range of approximately 1 wt % to approximately 60 wt %, desirably, approximately 5 wt % to approximately 30 wt %, and more desirably, approximately 7 wt % to approximately 20 wt %.

These compounds may be used singly, or a combination of two or more of these compounds may be used.

Instead of the liquid composition that generates an aggregate by means of an acid and cationic compound, it is also possible to generate an aggregate by means of an acid generator. With regard to acid generators, for an acid generator that generates acid when irradiated with light, it is suitable to use an acid generator which is used generally in a resist and an ultraviolet-curable cationic ink. Moreover, for an acid generator that generates acid by applying heat, it is suitable to use TAG manufactured by Sanshin Chemical Industry.

These acid generators can be added to the treatment liquid in the range of approximately 1 wt % to approximately 60 wt %, desirably, approximately 5 wt % to approximately 30 wt %, and more desirably, approximately 7 wt % to approximately 20 wt %.

Furthermore, a desirable example is one where at least one of the water-based ink and the treatment liquid according the present embodiment contains polymer particles having a glass transition temperature Tg not lower than 30° C. Desirably, the polymer particles are dispersed as a polymer latex in water and a hydrous organic solvent.

For the polymer latex used in the present embodiment, it is possible to use various types of latex, such as a styrene latex, an acrylic latex, or a vinyl acetate latex, and a styrene latex is particularly desirable. Desirably, the styrene latex is a latex of a styrene-butadiene copolymer or a styrene-isoprene copolymer, and more desirably, it is a styrene-butadiene copolymer, which may be applied onto art paper or coated paper.

The weight ratio of the styrene monomer unit and the butadiene monomer unit in the styrene butadiene copolymer is desirably 20:80 to 95:5, more desirably, 30:70 to 80:20, and even more desirably, 30:70 to 55:45.

Furthermore, desirably, the ratio of the whole of the copolymer that is occupied by the styrene monomer unit and butadiene monomer unit is 60 to 99 wt %.

Moreover, the polymer latex used in the present embodiment may be obtained by copolymerizing monomers other than styrene and butadiene, and the monomers for copolymerization may be any monomers that can be copolymerized, such as a styrene having a substituent group, acrylic acid, methacrylic acid, and esters or amides of these, and the like.

In this polymer latex, it is desirable to use acrylic acid, methacrylic acid, an acrylic acid ester, a methacrylic acid ester, or acrylamide 2-methyl propane sulfonate, and more desirably, acrylic acid, methacrylic acid or acrylamide 2-methyl propane sulfonate, and even more desirably, acrylic acid or methacrylic acid.

Moreover, desirably, the acrylic acid or the methacrylic acid is contained at a rate of 1 to 6 wt %, and more desirably, 2 to 5 wt %, with respect to the sum of the styrene and butadiene. Desirably, these polymer latexes contain acrylic acid.

Possible examples of a latex of a styrene-butadiene-acrylic acid copolymer used preferably in the present embodiment include the commercial products such as LACSTAR-3307B and 7132C (manufactured by Dai-Nippon Ink and Chemicals), Nipol Lx416 (manufactured by Zeon Corp), Nalster SBR (manufactured by Nippon A & L), and the like.

If the added amount of the polymer particles with respect to the water-based ink is large, then this has significant beneficial effects in improving fixing characteristics and wear resistance, but on the other hand, it also causes the viscosity to rise. Consequently, the added amount of polymer particles is desirably 0.5 to 20 wt %, more desirably, 1 to 20 wt %, even more desirably 3 to 20 wt %, and yet more desirably, 5 to 15 wt %, with respect to the ink.

Accordingly, if it is necessary to increase the added amount of the polymer micro-particles beyond this, then desirably, polymer particles are added to the treatment liquid also. The desirable content of the polymer particles in the treatment liquid is the same as it is in the case of ink.

Moreover, the glass transition temperature Tg of the polymer particles used in the present embodiment is calculated by using the following formula:

$$1/Tg = \Sigma(Xi/Tgi)$$

Here, it is supposed that the polymer particles are formed by copolymerizing n monomer components, from i=1 to i=n. $Xi$ is the weight fraction of the ith monomer ($\Sigma Xi=1$), and $Tgi$ is the glass transition temperature (absolute temperature) of the homopolymer of the ith monomer. Here, $\Sigma$ represents the sum for i=1 to n. By referring to the values given in the Polymer Handbook (3rd Edition) (J. Brandrup, E. H. Immergut, (Wiley-Interscience, 1989)), the values (Tgi) of the glass transition temperatures of the homopolymer of the respective monomers were calculated to be 100° C. in the case of styrene and −85° C. in the case of butadiene. Therefore, even if the types of constituent monomer are the same, it is still possible to control the value of Tg by altering the compositional ratio of these monomers.

Desirably, from the viewpoint of the storage stability of the ink, the glass transition temperature Tg of the polymer particles used in the present embodiment is room temperature or above, in other words, 30° C. or above. Furthermore, more desirably, the glass transition temperature Tg is 40° C. or above, and especially desirably, 50° C. or above. Drawbacks such as stickiness of the print sample can be envisaged in the case of a high glass transition temperature Tg, but by heating after printing, it is possible to minimize problems of stickiness and the like, even when using polymer particles having a high glass transition temperature Tg.

Moreover, desirably, the average particle size of the polymer particles is in the range of 10 nm to 1 μm, more desirably the range of 10 to 500 nm, even more desirably the range of 20 to 200 nm, and particularly desirably the range of 50 to 200 nm. Furthermore, there are no particular restrictions on the particle size distribution of the polymer particles and they may have a broad particle size distribution or they may have a monodisperse particle size distribution. Moreover, it is also possible to use a mixture of two or more types of polymer particles having a monodisperse particle size distribution.

Furthermore, the water-based ink and the treatment liquid according the present embodiment may contain other additives, provided that they do not impede the beneficial effects of the present invention. The other additive may be, for example, a commonly known additive, such as an anti-drying agent (moisturizing agent), a permeation promoter, an ultraviolet absorber, an anti-fading agent, an antibacterial agent, a pH adjuster, a surface tension adjuster, an emulsion stabilizer, a preservative, an antifoaming agent, a viscosity adjuster, a dispersant, a dispersion stabilizer, an anti-rusting agent, a chelating agent, or the like. Furthermore, it is also possible to increase the content of the polymer particles in the whole ink set, by including the polymer particles described above in the treatment liquid.

An anti-drying agent is used appropriately for the purpose of preventing blockages due to drying of the inkjet ink in the ink spray ports of the nozzles used in the inkjet recording method. Preferably, the anti-drying agent is a water-soluble organic solvent having a lower vapor pressure than water. More specific examples of the anti-drying agent include the water-soluble solvent described above. The anti-drying agent described above may be used alone, or two or more types of anti-drying agent may be used together in combination. Desirably, the content of these anti-drying agents in the ink is 10 to 50 wt %.

A permeation promoter is used, as appropriate, in order to make the inkjet ink permeate more readily into the paper. For the permeation promoter, it is possible to use an alcohol, such as ethanol, isopropanol, butanol, di(tri)ethylene glycol monobutyl ether, 1,2-hexanediol, or the like, or sodium lauryl sulfate, sodium oleate, a nonionic surface active agent, or the like. In general, these materials display sufficient effects when contained at a rate of 5 to 30 wt % in the ink. Preferably, a permeation promoter is added in an amount which prevents print bleeding or print-through effects.

An ultraviolet absorber is used in order to improve image conservation. For the ultraviolet absorber, it is possible to use; a benzotriazole compound as described in Japanese Patent Application Publication Nos. 58-185677, 61-190537, 2-782, 5-197075, and 9-34057, and the like; a benzophenone compound as described in Japanese Patent Application Publication Nos. 46-2784 and 5-194483, and U.S. Pat. No. 3,214,463, and the like; a cinnamic acid compound as described in Japanese Patent Application Publication Nos. 48-30492, 56-21141, and 10-88106, and the like; a triazine compound as described in Japanese Patent Application Publication Nos. 4-298503, 8-53427, 8-239368, 10-182621, and 8-501291, and the like; a compound as described in Research Disclosure No. 24239; or a so-called fluorescent brightening agent, which is a compound that absorbs ultraviolet light and generates fluorescent light, typical examples being a stilbene or a benzoxazole compound.

An anti-fading agent is used in order to improve image conservation. For the anti-fading agent, it is possible to use various types of organic or metallic complex anti-fading agents. The organic type of the anti-fading agent may be a hydroquinone, an alkoxyphenol, a dialkoxyphenol, a phenol, an aniline, an amine, an indane, a chromane, an alkoxyaniline, a heterocyclic compound, or the like. The metallic complex type of the anti-fading agent may be a nickel complex, a zinc complex, or the like. More specifically, it is possible to use a compound as described in the patents cited in Research Disclosure Nos. 17643 (volume VII, sections I to J), 15162, 18716 (p. 650, left-hand column), 36544 (p. 527), 307105 (p. 872), or 15162, or a compound included in the general formulae and examples of typical compounds described in Japanese Patent Application Publication No. 62-215272, pages 127 to 137.

Examples of an anti-rusting agent include: sodium dehydroacetate, sodium benzoate, sodium pyridine thione-1-oxide, p-hydroxybenzoate ethyl ester, 1,2-benzisothiazoline-3-one, or a salt thereof, or the like. It is desirable to use these materials at a concentration of 0.02 to 1.00 wt % in the ink.

For the pH adjuster, it is possible to use the neutralizing agent (an organic salt, inorganic alkali). In order to improve storage stability of the ink for inkjet recording, the pH adjuster is added desirably in such a manner that the ink reaches a pH of 6 to 10, and more desirably, in such a manner that the ink reaches a pH of 7 to 10.

The surface tension adjuster is, for example, a nonionic, cationic, anionic or betaine type surface active agent. In order that droplets can be ejected satisfactorily in an inkjet apparatus, the added amount of the surface tension adjuster is, desirably, an amount which adjusts the surface tension of the ink to 20 to 60 mN/m, and more desirably, 20 to 45 mN/m, and even more desirably, 25 to 40 mN/m. In this case, a hydrocarbon type of the surface active agent may be used, for instance. The hydrocarbon type of the surface active agent includes: an anionic surface active agent such as a fatty acid salt, an alkyl sulfate ester salt, an alkyl benzene sulfonate salt, an alkyl naphthalene sulfonate salt, a dialkyl sulfosuccinate salt, an alkyl phosphate ester salt, a condensation product of naphthalene sulfonate with formalin, a polyoxyethylene alkyl sulfonate ester salt, or the like; or a nonionic surface active agent, such as a polyoxyethylene alkyl ether, a polyoxyethylene alkyl allyl ether, a polyoxyethylene fatty acid ester, a sorbitan fatty acid ester, a polyoxyethylene sorbitan fatty acid ester, a polyoxyethylene alkyl amine, a glycerin fatty acid ester, an oxyethylene oxypropylene block copolymer, and the like. It is also desirable to use SURFYNOLS (Air Products & Chemicals), which is an acetylene-based polyoxyethylene oxide surface active agent. An amine oxide type of amphoteric surface active agent, such as N,N-dimethyl-N-alkyl amine oxide, is also desirable. Moreover, it is also possible to use the surface active agents cited in Japanese Patent Application Publication No. 59-157636, pages 37 and 38, and Research Disclosure No. 308119 (1989). Furthermore, it is also possible to use a fluoride (alkyl fluoride) type, or silicone type of surface active agent such as those described in Japanese Patent Application Publication Nos. 2003-322926, 2004-325707, and 2004-309806. It is also possible to use a surface tension adjuster of this kind as an anti-foaming agent; and a fluoride or silicone compound, or a chelating agent, such as EDTA, can also be used.

The ink for inkjet recording according to the present embodiment can be used for forming full-color images. In order to form a full-color image, it is possible to use a magenta-toned ink, a cyan-toned ink, and a yellow-toned ink; a black-toned ink may also be used in order to adjust the color tones. Furthermore, besides the yellow, magenta and cyan-toned inks, it is also possible to use red, green, blue or white inks, or so-called special colored inks used in the field of printing.

Composition of Image Forming Apparatus

Figure 1:
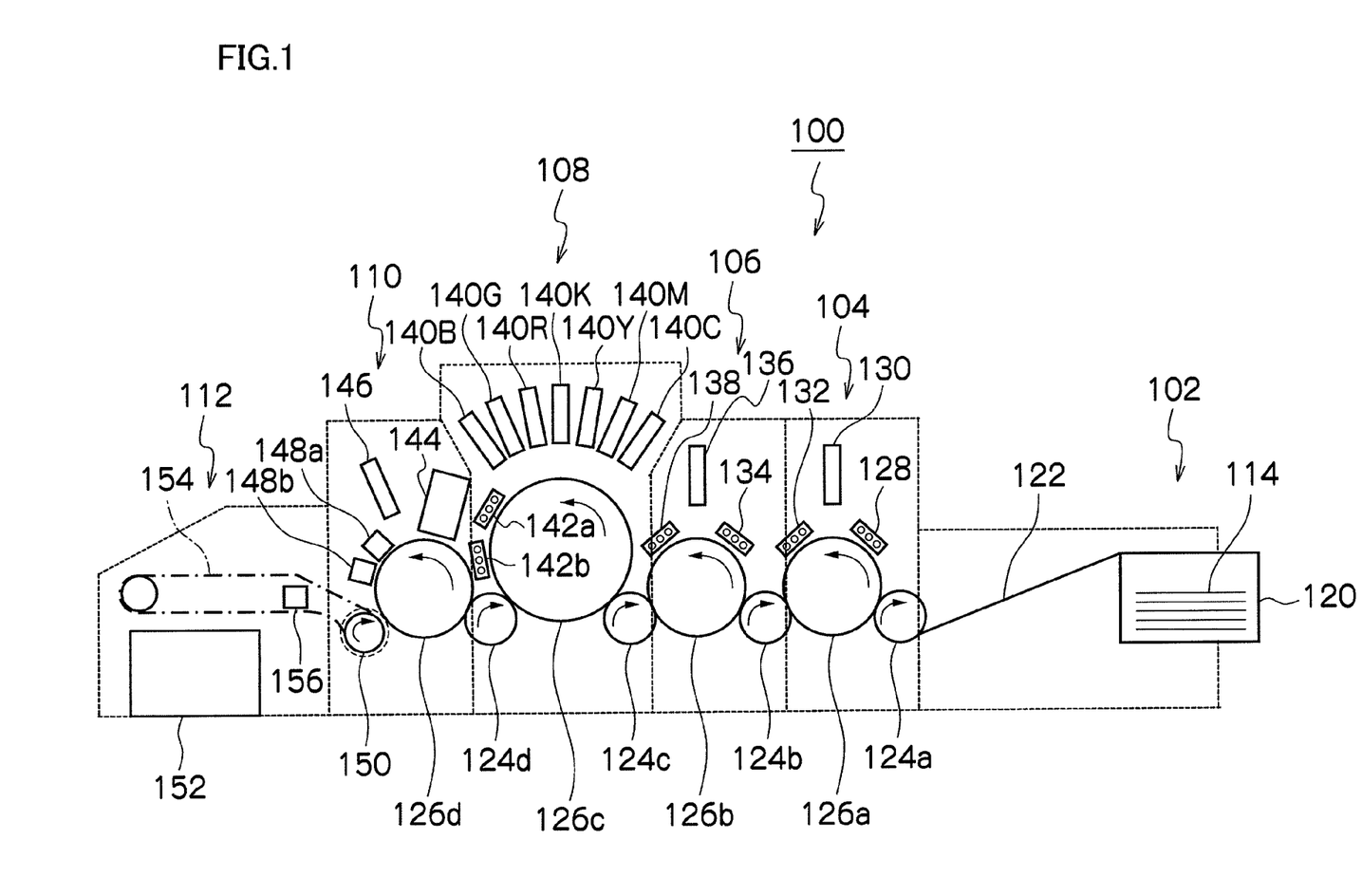
FIG. 1 is a general schematic drawing showing an image recording apparatus according to an embodiment of the present invention.

FIG. 1 is a general schematic drawing showing an image forming apparatus according to an embodiment of the present invention.

The image forming apparatus 100 shown in FIG. 1 is a single side machine, which is capable of printing only onto one surface of a recording medium 114. The image forming apparatus 100 includes: a paper supply unit 102, which supplies the recording medium 114; a permeation suppression processing unit 104, which carries out permeation suppression processing on the recording medium 114; a treatment agent deposition unit 106, which deposits treatment agent onto the recording medium 114; a print unit (image forming unit) 108, which forms an image by depositing the colored inks onto the recording medium 114; a transparent UV ink deposition unit 110, which deposits the transparent UV ink onto the recording medium 114; and a paper output unit 112, which conveys and outputs the recording medium 114 on which the image has been formed.

A paper supply platform 120 on which the recording media 114 are stacked is provided in the paper supply unit 102. A feeder board 122 is connected to the front (the left-hand side in FIG. 1) of the paper supply platform 120, and the recording media 114 stacked on the paper supply platform 120 are supplied one sheet at a time, successively from the uppermost sheet, to the feeder board 122. The recording medium 114 that has been conveyed to the feeder board 122 is supplied through a transfer drum 124a to the surface (circumferential surface) of a pressure drum 126a of the permeation suppression processing unit 104.

The permeation suppression processing unit 104 is provided with a paper preheating unit 128, a permeation suppressing agent head 130 and a permeation suppressing agent drying unit 132 at positions opposing the surface of the pressure drum 126a, in this order from the upstream side in terms of the direction of rotation of the pressure drum 126a (the counter-clockwise direction in FIG. 1).

The paper preheating unit 128 and the permeation suppressing agent drying unit 132 have heaters that can be temperature-controlled within prescribed ranges, respectively. When the recording medium 114 held on the pressure drum 126a passes through the positions opposing the paper preheating unit 128 and the permeation suppressing agent drying unit 132, it is heated by the heaters of these units.

The permeation suppressing agent head 130 ejects droplets of a permeation suppressing agent onto the recording medium 114 that is held on the pressure drum 126a. The permeation suppressing agent head 130 adopts the same composition as ink heads 140C, 140M, 140Y, 140K, 140R, 140G and 140B of the print unit 108, which is described below.

In the present embodiment, the inkjet head is used as the device for carrying out the permeation suppression processing on the surface of the recording medium 114; however, there are no particular restrictions on the device that carries out the permeation suppression processing. For example, it is also possible to use various other methods, such as a spray method, application method including a roll coater, or the like.

In the present embodiment, it is preferable to use a thermoplastic resin latex solution as the permeation suppressing agent. Of course, the permeation suppressing agent is not limited to being the thermoplastic resin latex solution, and for example, it is also possible to use lamina particles (e.g., mica), or a liquid rappelling agent (a fluoro-coating agent), or the like.

The treatment liquid deposition unit 106 is arranged after the permeation suppression processing unit 104. A transfer drum 124b is arranged between the pressure drum 126a of the permeation suppression processing unit 104 and a pressure drum 126b of the treatment liquid deposition unit 106, so as to make contact with same. Hence, after the recording medium 114 held on the pressure drum 126a of the permeation suppression processing unit 104 has been subjected to the permeation suppression processing, the recording medium 114 is transferred through the transfer drum 124b to the pressure drum 126b of the treatment liquid deposition unit 106.

The treatment liquid deposition unit 106 is provided with a paper preheating unit 134, a treatment liquid head 136 and a treatment liquid drying unit 138 at positions opposing the surface of the pressure drum 126b, in this order from the upstream side in terms of the direction of rotation of the pressure drum 126b (the counter-clockwise direction in FIG. 1).

The respective units of the treatment liquid deposition unit 106 (namely, the paper preheating unit 134, the treatment liquid head 136 and the treatment liquid drying unit 138) use similar compositions to the paper preheating unit 128, the permeation suppressing agent head 130 and the permeation suppressing agent drying unit 132 of the above-described permeation suppression processing unit 104.

When the recording medium 114 is introduced in the apparatus, the aggregating treatment liquid is deposited thereon by the treatment liquid head 136 to form the liquid layer of 5 µm thick on the whole surface. It is also possible to deposit the treatment liquid as to form an image by the inkjet head. In this case, the drying duration can be shortened and the required heating energy can be reduced.

Moreover, it is also possible to apply the aggregating treatment liquid by an application device such as a roller, instead of the inkjet head. In this case, it is possible to deposit the treatment liquid in a thinner layer than the case where the inkjet head is used. In this case also, the drying duration can be shortened and the required heating energy can be reduced.

The treatment liquid used in the present embodiment is an acidic liquid that has the action of aggregating the coloring materials contained in the inks that are ejected onto the recording medium 114 respectively from the ink heads 140C, 140M, 140Y, 140K, 140R, 140G and 140B disposed in the print unit 108, which is arranged at a downstream stage.

The heating temperature of a heater of the treatment liquid drying unit 138 is set to a temperature that is suitable to dry the treatment liquid having been deposited on the surface of the recording medium 114 by the ejection operation of the treatment liquid head 136 arranged to the upstream side in terms of the direction of rotation of the pressure drum 126b, and thereby a solid or semi-solid aggregating treatment agent layer (a thin film layer of dried treatment liquid) is formed on the recording medium 114.

For example, the recording medium 114 that has passed the treatment liquid head 136 is dried for one second by the treatment liquid drying unit 138 on the downstream side, using a hot air flow at 70° C., and is then dried on a transfer roller 124c at 60° C. Thus, a solid or semi-solid aggregating treatment agent layer is formed on the recording medium 114.

The "solid or semi-solid aggregating treatment agent layer" includes a layer having a water content rate of 0% to 70%, where the water content rate is defined as: "Water content rate"="Weight of water contained in treatment liquid after drying, per unit surface area $(g/m^2)$"/"Weight of treatment liquid after drying, per unit surface area $(g/m^2)$".

The drying is carried out by at least one of air blowing, heating, and irradiation of energizing radiation.

A desirable mode is one in which the recording medium 114 is preheated by the heater of the paper preheating unit 134, before depositing the treatment liquid on the recording medium 114, as in the present embodiment. In this case, it is possible to restrict the heating energy required to dry the treatment liquid to a low level, and therefore energy savings can be made.

The print unit 108 is arranged after the treatment liquid deposition unit 106. The transfer drum 124c is arranged between the pressure drum 126b of the treatment liquid deposition unit 106 and a pressure drum 126c of the print unit 108, so as to make contact with same. Hence, after the treatment liquid is deposited and the solid or semi-solid aggregating treatment agent layer is formed on the recording medium 114 that is held on the pressure drum 126b of the treatment liquid deposition unit 106, the recording medium 114 is transferred through the transfer drum 124c to the pressure drum 126c of the print unit 108.

The print unit 108 is provided with the ink heads 140C, 140M, 140Y, 140K, 140R, 140G and 140B, which correspond respectively to the seven colors of ink, C, M, Y, K, R, G and B, and solvent drying units 142a and 142b at positions opposing the surface of the pressure drum 126c, in this order from the upstream side in terms of the direction of rotation of the pressure drum 126c (the counter-clockwise direction in FIG. 1).

The ink heads 140C, 140M, 140Y, 140K, 140R, 140G and 104B employ the inkjet type recording heads (inkjet heads), similarly to the permeation suppressing agent head 130 and the treatment liquid head 136. The ink heads 140C, 140M, 140Y, 140K, 140R, 140G and 140B respectively eject droplets of corresponding colored inks onto the recording medium 114 held on the pressure drum 126c. The ink ejection volume is 2 pl and the recording density is 1200 dpi in both the main scanning direction and the sub-scanning direction.

Each of the ink heads 140C, 140M, 140Y, 140K, 140R, 140G and 140B is a full-line head having a length corresponding to the maximum width of the image forming region of the recording medium 114 held on the pressure drum 126c, and having a plurality of nozzles (not shown) for ejecting the ink, which are arranged on the ink ejection surface of the head through the full width of the image forming region. The ink heads 140C, 140M, 140Y, 140K, 140R, 140G and 140B are arranged so as to extend in a direction that is perpendicular to the direction of rotation of the pressure drum 126c (the conveyance direction of the recording medium 114).

According to the composition in which the full line heads having the nozzle rows covering the full width of the image forming region of the recording medium 114 are provided respectively for the colors of ink, it is possible to record a primary image on the image forming region of the recording medium 114 by performing just one operation of moving the recording medium 114 and the ink heads 140C, 140M, 140Y, 140K, 140R, 140G and 140B relatively with respect to each other (in other words, by one sub-scanning action). Therefore, it is possible to achieve a higher printing speed compared to a case that uses a serial (shuttle) type of head moving back and forth reciprocally in the main scanning direction, which is the direction perpendicular to the sub-scanning direction or the conveyance direction of the recording medium 114, and hence it is possible to improve the print productivity.

Moreover, although the configuration with the seven colors of C, M, Y, K, R, G and B is described in the present embodiment, the combinations of the ink colors and the number of colors are not limited to those. Light and/or dark inks, and special color inks can be added as required. For example, a configuration is possible in which ink heads for ejecting light-colored inks, such as light cyan and light magenta, are added. Furthermore, there is no particular restriction on the arrangement sequence of the heads of the respective colors.

Each of the solvent drying units 142a and 142b has a composition including a heater of which temperature can be controlled within a prescribed range, similarly to the paper preheating units 128 and 134, the permeation suppressing agent drying unit 132, and the treatment liquid drying unit 138, which have been described above. As described hereinafter, when ink droplets are deposited onto the solid or semi-solid aggregating treatment agent layer, which has been formed on the recording medium 114, an ink aggregate (coloring material aggregate) is formed on the recording medium 114, and furthermore, the ink solvent that has separated from the coloring material spreads, so that a liquid layer containing dissolved aggregating treatment agent is formed. The solvent component (liquid component) left on the recording medium 114 in this way is a cause of curling of the recording medium 114 and also leads to deterioration of the image. Therefore, in the present embodiment, after depositing the droplets of the colored inks from the ink heads 140C, 140M, 140Y, 140K, 140R, 140G and 140B onto the recording medium 114, heating is carried out by the heaters of the solvent drying units 142a and 142b with the hot air of 70° C. over a period of two seconds, and the solvent component is evaporated off and the recording medium 114 is dried.

The transparent UV ink deposition unit 110 is arranged after the print unit 108. A transfer drum 124d is arranged between the pressure drum 126c of the print unit 108 and a pressure drum 126d of the transparent UV ink deposition unit 110, so as to make contact with same. Hence, after the colored inks are deposited on the recording medium 114 that is held on the pressure drum 126c of the print unit 108, the recording medium 114 is transferred through the transfer drum 124d to the pressure drum 126d of the transparent UV ink deposition unit 110.

The transparent UV ink deposition unit 110 is provided with a print determination unit 144, which reads in the print results of the print unit 108, a transparent UV ink head 146, and first UV light lamps 148a and 148b at positions opposing the surface of the pressure drum 126d, in this order from the upstream side in terms of the direction of rotation of the pressure drum 126d (the counter-clockwise direction in FIG. 1).

The print determination unit 144 includes an image sensor (a line sensor, or the like), which captures an image of the print result of the print unit 108 (the droplet ejection results of the ink heads 140C, 140M, 140Y, 140K, 140R, 140G and 140B), and functions as a device for checking for nozzle blockages and other ejection defects, on the basis of the droplet ejection image captured through the image sensor.

The transparent UV ink head 146 employs the same composition as the ink heads 140C, 140M, 140Y, 140K, 140R, 140G and 140B of the print unit 108, and ejects droplets of the transparent UV ink so as to deposit the droplets of the transparent UV ink over the droplets of colored inks having been deposited on the recording medium 114 by the ink heads 140C, 140M, 140Y, 140K, 140R, 140G and 140B. Of course, it may also employ a composition different than the ink heads 140C, 140M, 140Y, 140K, 140R, 140G and 140B of the print unit 108.

The first UV lamps 148a and 148b cure the transparent UV ink by irradiating UV light onto the transparent UV ink on the recording medium 114 when the recording medium 114 passes the positions opposing the first UV lamps 148a and 148b after the droplets of the transparent UV ink have been deposited on the recording medium 114.

The paper output unit 112 is arranged after the transparent UV ink deposition unit 110. The paper output unit 112 is provided with a paper output drum 150, which receives the recording medium 114 on which the droplets of the transparent UV ink have been deposited, a paper output platform 152, on which the recording media 114 are stacked, and a paper output chain 154 having a plurality of paper output grippers, which is spanned between a sprocket arranged on the paper output drum 150 and a sprocket arranged above the paper output platform 152.

A second UV lamp 156 is arranged at the inner side of the paper output chain 154 between the sprockets. The second UV lamp 156 cures the transparent UV ink by irradiating UV light onto the transparent UV ink on the recording medium 114, by the time that the recording medium 114 having been transferred from the pressure drum 126d of the transparent UV ink deposition unit 110 to the paper output drum 150 is conveyed by the paper output chain 154 to the paper output platform 152.

Figure 2:
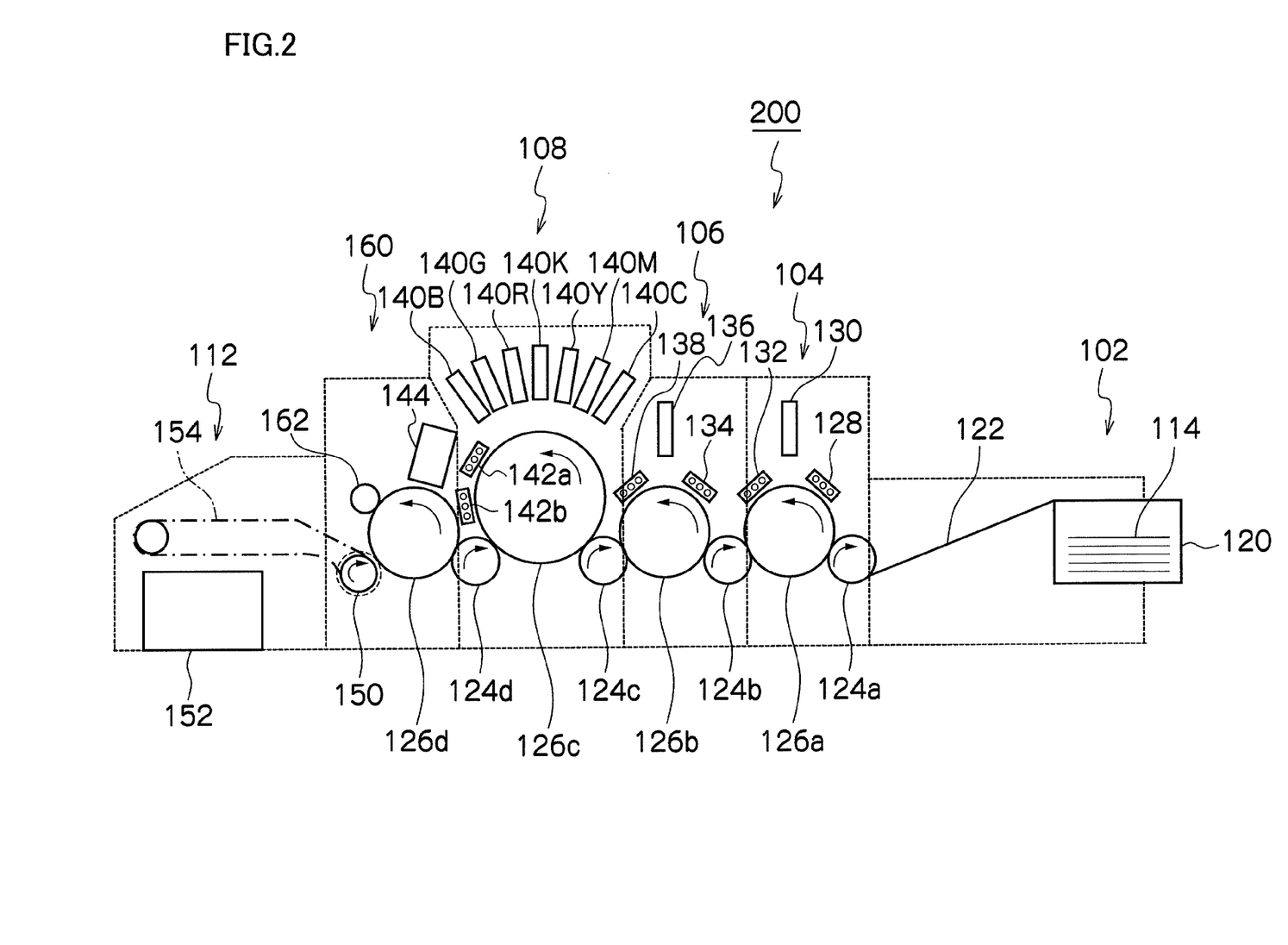
FIG. 2 is a general schematic drawing showing an image recording apparatus according to another embodiment of the present invention.

FIG. 1 shows the embodiment where the transparent ultraviolet-curable ink deposition unit 110 is provided following the print unit 108. It is also possible to provide a heating and fixing unit 160 as shown in FIG. 2, instead of the transparent ultraviolet-curable ink deposition unit 110. In FIG. 2, members that are the same as or similar to FIG. 1 are denoted with the same reference numerals in FIG. 1 and description thereof may be omitted.

The image forming apparatus 200 shown in FIG. 2 is a single side machine, which is capable of printing only onto one surface of the recording medium 114. The inkjet recording apparatus 200 includes: the paper supply unit 102, which supplies the recording medium 114; the treatment liquid deposition unit 106, which deposits the treatment liquid on the recording medium 114; the print unit (image forming unit) 108, which forms an image by depositing droplets of colored ink onto the recording medium 114; a heating and fixing unit 160, which fixes the image formed on the recording medium 114; and the paper output unit 112, which conveys and outputs the recording medium 114 on which the image has been formed.

The heating and fixing unit 160 is arranged after the print unit 108. A transfer drum 124d is arranged between the pressure drum (print drum) 126c of the print unit 108 and the pressure drum (fixing drum) 126d of the heating and fixing unit 160, so as to make contact with same. Hence, after the colored inks are deposited on the recording medium 114 that is held on the pressure drum 126c of the print unit 108, the recording medium 114 is transferred through the transfer drum 124d to the pressure drum 126d of the heating and fixing unit 160.

The heating and fixing unit 160 is provided with the print determination unit 144, which reads in the print results of the print unit 108, and a heating roller 162 at positions opposing the surface of the pressure drum 126d, in this order from the upstream side in terms of the direction of rotation of the pressure drum 126c (the counter-clockwise direction in FIG. 2). The heating roller 162 is disposed so as to make direct contact with the image formed on the recording medium 114.

In the heating and fixing unit 160, a fixing mechanism is constituted of the heating roller 162 having a built-in heater (not shown) and the pressure drum 126d. The pressure drum has a built-in heater (not shown) and functions as both the heating roller and the pressurization roller.

For example, the recording medium 114 on which the image has been formed is pressed between the pressure drum 126d at 60° C. and the heating roller 162 at 110° C., at a nip pressure of 1 MPa, so that the image is heated and fixed to the recording medium 114. Desirably, if a polymer resin (in the form of particles) is included in the undercoating liquid or ink, the heating temperature is set in accordance with the melting temperature of the polymer resin.

Figure 3:
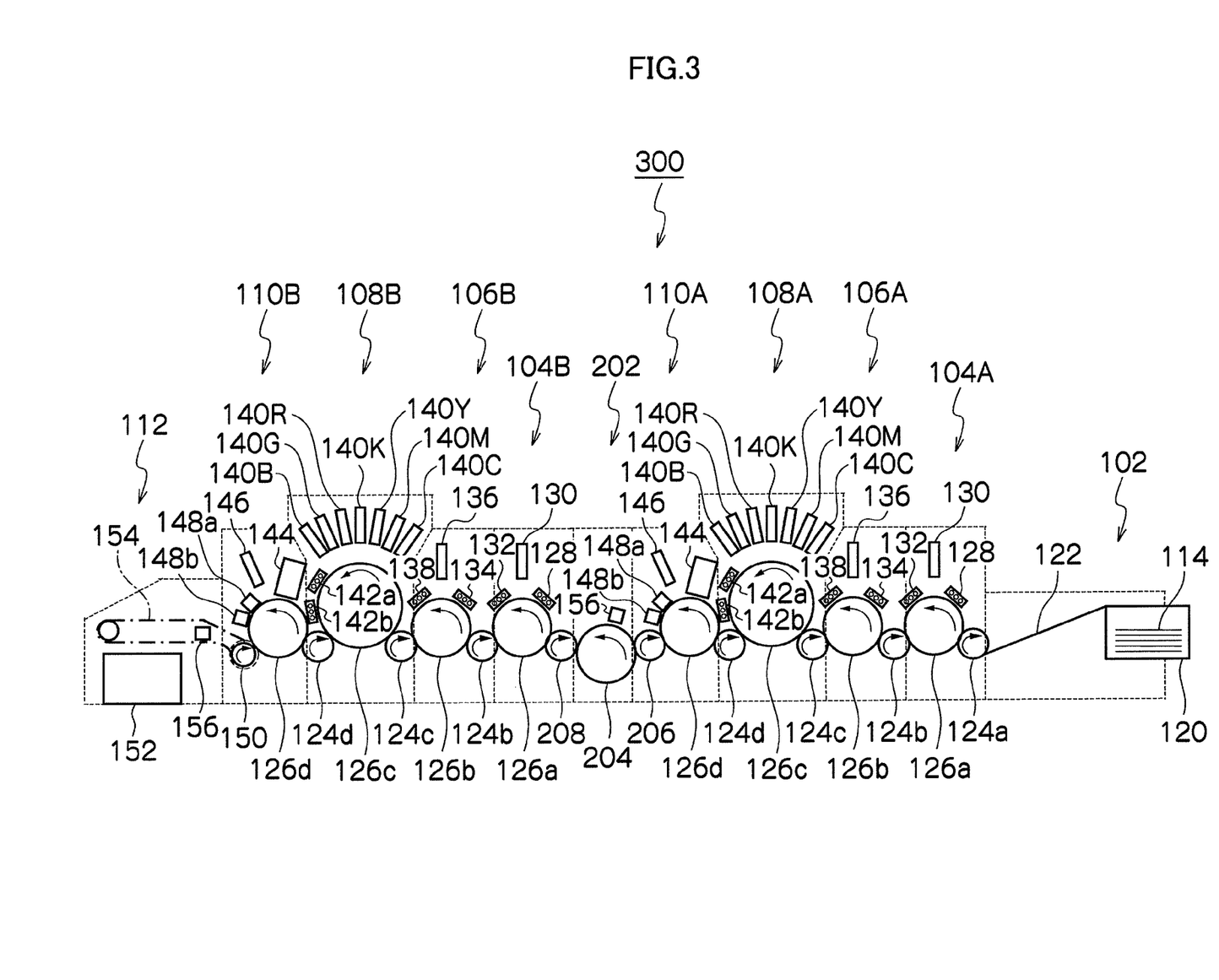
FIG. 3 is a general schematic drawing showing an image recording apparatus according to yet another embodiment of the present invention.

FIG. 3 is a general schematic drawing showing an image recording apparatus which uses the ink set for inkjet recording according to another embodiment of the present invention. In FIG. 3, members that are the same as or similar to FIG. 1 or 2 are denoted with the same reference numerals and description thereof is omitted here.

The image forming apparatus 300 shown in FIG. 3 is a double side machine, which is capable of printing onto both surfaces of a recording medium 114. The image forming apparatus 300 includes: in order from the upstream side in terms of the direction of conveyance of the recording medium 114 (the right to left direction in FIG. 3), a paper supply unit 102, a first permeation suppression processing unit 104A, a first treatment liquid deposition unit 106A, a first print unit 108A, a first transparent UV ink deposition unit 110A, a reversing unit 202, which reverses the recording surface (image forming surface) of the recording medium 114, a second permeation suppression processing unit 104B, a second treatment liquid deposition unit 106B, a second print unit 108B, a second transparent UV ink deposition unit 110B, and a paper output unit 112. The image forming apparatus 300 is thus provided with a composition including the permeation suppression processing unit 104, the treatment liquid deposition unit 106, the print unit 108 and the transparent UV ink deposition unit 110 of the image forming apparatus 100 shown in FIG. 1, on each side of the reversing unit 202.

In the image forming apparatus 300 according to the present embodiment, firstly, similarly to the image forming apparatus 100 shown in FIG. 1, permeation suppression processing and droplet deposition of the treatment liquid, the colored inks, and the transparent UV ink are carried out by the first permeation suppression processing unit 104A, the first treatment liquid deposition unit 106A, the first print unit 108A, and the first transparent UV ink deposition unit 110A successively onto one surface of the recording medium 114, which is supplied from the paper supply unit 102.

After thereby forming an image on the one surface of the recording medium 114, the recording medium 114 is reversed when it is transferred to the reversing drum 204 from the pressure drum 126d of the first transparent UV ink deposition unit 110A through the transfer drum 206. The reversal mechanism for the recording medium 114 employs commonly known technology and therefore a concrete description is not given here. A second UV lamp 156 is arranged at a position opposing the surface of the reversing drum 204, and this serves to cure the transparent UV ink that has been deposited on the recording medium 114, together with the first UV lamps 148a and 148b of the first transparent UV ink deposition unit 110A.

The recording medium 114 that has been reversed is transferred from the reversing drum 204 through the transfer drum 208 to the pressure drum 126a of the second permeation suppression processing unit 104B. Thereupon, permeation suppression processing and droplet deposition of the treatment liquid, the colored inks, and the transparent UV ink, and the like, are carried out by the second permeation suppression processing unit 104B, the second treatment liquid deposition unit 106B, the second print unit 108B and the second transparent UV ink deposition unit 110B successively onto the other surface of the recording medium 114.

After thus forming the images on both surfaces of the recording medium 114, the recording medium 114 is conveyed onto the paper output platform 152 by the paper output chain 154, and is stacked on the paper output platform 152.

EXAMPLES

Below, the characteristic features of the present invention are described more specifically on the basis of practical examples; however, the scope of the present invention should not be interpreted as being limited by the specific examples described below.

Preparation of Aggregating Treatment Liquids

<Preparation of Treatment Liquid L-1>

| | |
|---|---|
| Isobar G | 90 g |
| Diethylene glycol monobutyl ether | 10 g |

<Preparation of Treatment Liquid L-2>

| | |
|---|---|
| San-Aid SI (made by Sanshin Chemical Industries) | 10 g |
| GP-250 | 22 g |
| Olfine E1010 (made by Nissin Kagaku Kogyo) | 1 g |
| Deionized water | 67 g |

<Preparation of Treatment Liquid L-3>

| | |
|---|---|
| Octope Zr | 12 g |
| GP-250 | 20 g |
| Olfine E1010 (made by Nissin Kagaku Kogyo) | 1 g |
| Deionized water | 67 g |

<Preparation of Treatment Liquid L-4>

| | |
|---|---|
| Citric acid | 10 g |
| GP-250 | 20 g |
| Olfine E1010 (made by Nissin Kagaku Kogyo) | 1 g |
| Deionized water | 69 g |

<Preparation of Treatment Liquid L-5>

| | |
|---|---|
| Citric acid | 10 g |
| GP-250 | 15 g |
| 50-HB-400 | 5 g |
| Olfine E1010 (made by Nissin Kagaku Kogyo) | 1 g |
| Deionized water | 69 g |

<Preparation of Treatment Liquid L-6>

| | |
|---|---|
| Malonic acid | 8 g |
| 50-HB-400 | 15 g |
| Diethylene glycol monobutyl ether | 5 g |
| Olfine E1010 (made by Nissin Kagaku Kogyo) | 1 g |
| Deionized water | 71 g |

<Preparation of Treatment Liquid L-7>

| | |
|---|---|
| Citric acid | 10 g |
| Diethylene glycol monoethyl ether | 10 g |
| Olfine E1010 (made by Nissin Kagaku Kogyo) | 1 g |
| Deionized water | 79 g |

<Preparation of Treatment Liquid L-8>

| | |
|---|---|
| Citric acid | 10 g |
| Diethylene glycol monoethyl ether | 20 g |
| Olfine E1010 (made by Nissin Kagaku Kogyo) | 1 g |
| Deionized water | 69 g |

<Preparation of Treatment Liquid L-9>

| | |
|---|---|
| Citric acid | 10 g |
| GP-250 | 10 g |
| Olfine E1010 (made by Nissin Kagaku Kogyo) | 1 g |
| Deionized water | 79 g |

<Preparation of Treatment Liquid L-10>

| | |
|---|---|
| Citric acid | 10 g |
| GP-250 | 12 g |
| Olfine E1010 (made by Nissin Kagaku Kogyo) | 1 g |
| Deionized water | 77 g |

<Preparation of Treatment Liquid L-11>

| | |
|---|---|
| Citric acid | 10 g |
| GP-250 | 30 g |
| Olfine E1010 (made by Nissin Kagaku Kogyo) | 1 g |
| Deionized water | 59 g |

<Preparation of Treatment Liquid L-12>

| | |
|---|---|
| Citric acid | 10 g |
| Diethylene glycol monoethyl ether | 60 g |
| Olfine E1010 (made by Nissin Kagaku Kogyo) | 1 g |
| Deionized water | 29 g |

<Preparation of Treatment Liquid L-13>

| | |
|---|---|
| Citric acid | 10 g |
| Glycerin | 40 g |
| Olfine E1010 (made by Nissin Kagaku Kogyo) | 1 g |
| Deionized water | 49 g |

<Preparation of Treatment Liquid L-14>

| | |
|---|---|
| Citric acid | 10 g |
| Glycerin | 20 g |
| Olfine E1010 (made by Nissin Kagaku Kogyo) | 1 g |
| Deionized water | 69 g |

<Preparation of Treatment Liquid L-15>

| | |
|---|---|
| Citric acid | 10 g |
| GP-250 | 8 g |
| Olfine E1010 (made by Nissin Kagaku Kogyo) | 1 g |
| Deionized water | 81 g |

Preparation of Inks
<Preparation of Water-Based Ink I-1: GP-250 (20 wt %)>

| | |
|---|---|
| Cromophtal Jet Magenta DMQ (PR-122) (made by Ciba Specialty Chemicals) | 10 g |
| Polymer for dispersion | 10 g |
| Deionized water | 30 g |

A dispersion liquid was prepared by combining and agitating the materials described above. Thereupon, ultrasonic waves were irradiated for two hours in an intermittent fashion (irradiation 0.5 second/halt 1.0 second) in order to further disperse the pigment, using an ultrasound irradiation apparatus (SONICS Vibra-cell VC-750, tapered micro chip: diameter of 5 mm, amplitude: 30%), and a 20 wt % pigment dispersion liquid was obtained.

Separately from the 20 wt % pigment dispersion liquid, the following compounds were measured and mixed together to prepare a mixed liquid I:

| | |
|---|---|
| GP-250 | 20 g |
| Olfine E1010 (made by Nissin Kagaku Kogyo) | 1 g |
| Deionized water | 11 g |

This mixed liquid I was titrated slowly into 23.0 g of an agitated 44% SBR dispersion liquid (polymer particles: acrylic acid 3 wt %, Tg 30° C.) and agitated to prepare a mixed liquid II. The mixed liquid II was then titrated slowly into the aforementioned 20% pigment dispersion liquid and agitated and mixed, to prepare 100 g of magenta ink.

<Preparation of Water-Based Ink I-2>

100 g of magenta ink was prepared by adding GP-250 (15 g) and 50-HB-400 (5 g) instead of the GP-250 (20 g), in the preparation of the mixed liquid I of the water-based ink I-1.

<Preparation of Water-Based ink I-3>

100 g of magenta ink was prepared by adding GP-250 (12 g) and diethylene glycol monobutyl ether (7 g) instead of the GP-250 (20 g), in the preparation of the mixed liquid I of the water-based ink I-1.

<Preparation of Water-Based Ink I-4>

100 g of magenta ink was prepared by adding GP-250 (10 g) instead of the GP-250 (20 g), in the preparation of the mixed liquid I of the water-based ink I-1.

<Preparation of Water-Based Ink I-5>

100 g of magenta ink was prepared by adding GP-250 (12 g) instead of the GP-250 (20 g), in the preparation of the mixed liquid I of the water-based ink I-1.

<Preparation of Water-Based Ink I-6>

100 g of magenta ink was prepared by adding GP-250 (70 g) instead of the GP-250 (20 g), in the preparation of the mixed liquid I of the water-based ink I-1.

<Preparation of Water-Based Ink I-7>

100 g of magenta ink was prepared by adding GP-250 (30 g) instead of the GP-250 (20 g), in the preparation of the mixed liquid I of the water-based ink I-1.

<Preparation of Water-Based Ink I-8>

100 g of magenta ink was prepared by adding diethylene glycol monoethyl ether (20 g) instead of the GP-250 (20 g), in the preparation of the mixed liquid I of the water-based ink I-1.

<Preparation of Water-Based Ink I-9>

100 g of magenta ink was prepared by adding glycerin (20 g) instead of the GP-250 (20 g), in the preparation of the mixed liquid I of the water-based ink I-1.

<Preparation of Water-Based Ink I-10: GP-250 (8 wt %)>

100 g of magenta ink was prepared by adding GP-250 (8 g) instead of the GP-250 (20 g), in the preparation of the mixed liquid I of the water-based ink I-1.

Image Recording and Evaluation

Ink sets for inkjet recording IS-1 to IS-18 were prepared by combining the treatment liquids L-1 to L-15 and water-based inks I-1 to I-10 prepared as described above. An image was formed on a recording medium by using the ink sets for inkjet recording IS-1 to IS-18, and the evaluations described below were made. Table 1 shows a summary of the combinations of the treatment liquids and the water-based inks and the corresponding evaluation results.

An image for evaluation was formed under the following conditions:

Recording medium: Urite (Nippon Paper Group)
Image: 2 pl; 1200×1200 dpi; 100% solid image; image size: 150×150 mm <Evaluation of Movement of Coloring Material>

The image formed on the recording medium was evaluated at a magnification of 150 times, with a Keyence VHX-900. Evaluation was made in the following three evaluation verdicts: "Good": there was no movement of coloring material; "Fair": there were isolated dots; and "Poor": there were isolated dots moving from depositing positions.

<Evaluations of Stickiness>

Japanese paper was pressed against the image formed on the recording medium to evaluate the stickiness. There were two evaluation verdicts: "Good": no sticking; and "Poor": sticking.

<Evaluation of Curl>

An image was formed on a recording medium, cut to a size of 5×50 mm and the curl value was determined. In the present experiment, the curl value means a value determined from 10/R (=curvature) (cm). There were four evaluation verdicts: "Excellent": curl value of not higher than 0.5; "Good": curl value of higher than 0.5 and not higher than 1.0; "Fair": curl value of higher than 1.0 and not higher than 2.0; and "Poor": curl value of higher than 2.0.

TABLE 1

| Ink set | Treatment liquid | Water-based ink | Movement of coloring material | Stickiness | Curling |
|---|---|---|---|---|---|
| IS-1 | L-1 | I-1 | Fair | Good | Good |
| IS-2 | L-2 | I-1 | Good | Fair | Good |
| IS-3 | L-3 | I-1 | Good/Fair | Good | Good |
| IS-4 | L-4 | I-1 | Good | Good | Good |
| IS-5 | L-5 | I-2 | Good | Good | Excellent |
| IS-6 | L-6 | I-3 | Good | Good | Excellent |
| IS-7 | L-7 | I-1 | Good | Good | Fair |
| IS-8 | L-8 | I-4 | Good | Good | Fair |
| IS-9 | L-9 | I-4 | Good | Good | Fair |
| IS-10 | L-4 | I-5 | Good | Good | Good |
| IS-11 | L-10 | I-1 | Good | Good | Good |
| IS-12 | L-4 | I-6 | Poor | Poor | Good |
| IS-13 | L-11 | I-1 | Fair | Poor | Good |
| IS-14 | L-4 | I-7 | Fair | Poor | Good |
| IS-15 | L-12 | I-8 | Poor | Poor | Good |
| IS-16 | L-13 | I-9 | Fair | Poor | Poor |
| IS-17 | L-14 | I-1 | Good | Good | Poor |
| IS-18 | L-15 | I-10 | Good | Good | Poor |

The ink sets IS-1 to IS-11 are the practical examples of the present invention, in which each of the water-based ink and the treatment liquid contains 10 to 25 wt % of the water-soluble high-boiling-point organic solvent having the SP value of 30 or lower. As a result, the evaluation verdicts of "Fair" or better were obtained for all of the evaluation items: movement of coloring material, stickiness and curl.

In the ink set IS-12, the ink contains 70 wt % of the water-soluble high-boiling-point organic solvent having the SP value of 30 or lower, and the evaluation verdicts for the floating of coloring material and stickiness were "Poor". In the ink set IS-13, the treatment liquid contains 30 wt % of the water-soluble high-boiling-point organic solvent having the SP value of 30 or lower, and the evaluation verdict for stickiness was "Poor". In the ink set IS-14, the ink contains 30 wt % of the water-soluble high-boiling-point organic solvent having the SP value of 30 or lower, and the evaluation verdict for stickiness was "Poor". In the ink set IS-15, the treatment liquid contains 60 wt % of the water-soluble high-boiling-point organic solvent having the SP value of 30 or lower, and the evaluation verdicts for the floating of coloring material and stickiness were "Poor". In the ink set IS-16, the treatment liquid contains 40 wt % of the water-soluble high-boiling-point organic solvent having the SP value greater than 30 and the ink contains 20 wt % of the water-soluble high-boiling-point organic solvent having the SP value greater than 30, and the evaluation verdicts for stickiness and curling were "Poor". In the ink set IS—17, the treatment liquid contains 20 wt % of the water-soluble high-boiling-point organic solvent having the SP value greater than 30 and the ink contains 20 wt % of the water-soluble high-boiling-point organic solvent having the SP value greater than 30, and the evaluation verdict for curling was "Poor". In the ink set IS-18, the treatment liquid contains 8 wt % of the water-soluble high-boiling-point organic solvent having the SP value greater than 30 and the ink contains 8 wt % of the water-soluble high-boiling-point organic solvent having the SP value greater than 30, and the evaluation verdict for curling was "Poor".

As Table 1 reveals, it can be seen that the ink set for inkjet recording in which both the water-based ink and the treatment liquid contain 10 to 25 wt % of the water-soluble high-boiling-point organic solvent having the SP value of 30 or lower produce an average or higher evaluation for each of the items: movement of coloring material, stickiness or curling.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An ink set for inkjet recording, comprising:
    a water-based ink containing pigment particles and 10 to 25 wt % of water-soluble organic solvent having an SP value of not higher than 30 $(MPa)^{1/2}$ and a boiling point of 200° C. or higher at 1 atm; and
    a treatment liquid containing a fluidity reducing agent which reduces fluidity of the pigment particles by making contact with the water-based ink, and 10 to 25 wt % of water-soluble organic solvent having an SP value of not higher than 30 $(MPa)^{1/2}$ and a boiling point of 200° C. or higher at 1 atm,
    wherein the water-based ink and the treatment liquid are substantially free from organic solvent having an SP value of higher than 30 $(MPa)^{1/2}$.

2. The ink set for inkjet recording as defined in claim 1, wherein the fluidity reducing agent includes at least one of a solvent, an acid generator and an acid treatment liquid which reduce phase-solubility of the pigment particles.

3. The ink set for inkjet recording as defined in claim 1, wherein at least one of the water-based ink and the treatment liquid further contains polymer particles.

4. The ink set for inkjet recording as defined in claim 1, wherein at least one of the water-based ink and the treatment liquid contains at least two types of water-soluble high-boiling-point organic solvents having an SP value of not higher than 30.

* * * * *